(12) United States Patent
Cheng et al.

(10) Patent No.: US 7,720,577 B2
(45) Date of Patent: May 18, 2010

(54) METHODS AND SYSTEMS FOR DATA LINK FRONT END FILTERS FOR SPORADIC UPDATES

(75) Inventors: Shirley N. Cheng, Richmond Heights, MO (US); Michael G. Neff, Lake St. Louis, MO (US); Ted L. Johnson, Florissant, MO (US)

(73) Assignee: The Boeing Company, Chicago, IL (US)

( * ) Notice: Subject to any disclaimer, the term of this patent is extended or adjusted under 35 U.S.C. 154(b) by 1021 days.

(21) Appl. No.: 11/383,919

(22) Filed: May 17, 2006

(65) Prior Publication Data

US 2007/0271032 A1 Nov. 22, 2007

(51) Int. Cl.
*G05D 1/00* (2006.01)
(52) U.S. Cl. .................. 701/2; 701/26; 701/3; 701/210
(58) Field of Classification Search ...... 701/2, 701/3, 4, 11, 200–213, 26, 223; 244/181, 244/75.1, 190; 342/370, 372
See application file for complete search history.

(56) References Cited

U.S. PATENT DOCUMENTS

| | | | |
|---|---|---|---|
| 3,799,676 A | 3/1974 | Chatterton | |
| 5,672,872 A | 9/1997 | Wu et al. | |
| 5,809,171 A | 9/1998 | Neff et al. | |
| 5,890,808 A | 4/1999 | Neff et al. | |
| 5,946,422 A | 8/1999 | Neff et al. | |
| 5,982,930 A | 11/1999 | Neff et al. | |
| 5,982,945 A | 11/1999 | Neff et al. | |
| 7,545,322 B2* | 6/2009 | Newberg et al. | 342/372 |
| 7,546,187 B2* | 6/2009 | Bodin et al. | 701/26 |
| 7,581,702 B2* | 9/2009 | Olson et al. | 244/189 |
| 2003/0222789 A1 | 12/2003 | Polyakov | |
| 2004/0006424 A1 | 1/2004 | Joyce et al. | |

(Continued)

FOREIGN PATENT DOCUMENTS

EP 1262789 12/2002

(Continued)

OTHER PUBLICATIONS

Blake, et al., "Data Fusion for Visual Tracking With Particles", Proceedings of the IEEE, New York, vol. 92, No. 3, Mar. 2004, pp. 495-513.

(Continued)

*Primary Examiner*—Richard M. Camby

(57) ABSTRACT

Systems and methods having front end filters for data links for improved tracking of moving objects are disclosed. In one embodiment, a method includes sensing at least one characteristic of a moveable object using a sensor of an acquisition system, and sensing at least one characteristic of the moveable object using an auxiliary sensor. A data link update is transmitted from the auxiliary sensor to the acquisition system, and the data link update is conditioned to provide composite likelihood. The conditioning includes differencing the data link update and at least one predicted characteristic of the moveable object to produce at least one residual (e.g. using a plurality of Kalman filters). A viewing direction of the sensor may be adjusted based at least in part on the composite likelihood. In another embodiment, residuals are projected along sensor line of sight to form a multi-modal non-Gaussian composite likelihood.

20 Claims, 7 Drawing Sheets

U.S. PATENT DOCUMENTS

2006/0058954 A1  3/2006  Haney

FOREIGN PATENT DOCUMENTS

| EP | 1293925 | 3/2003 |
| GB | 2330801 | 5/1999 |
| JP | 2004325165 | 11/2004 |
| WO | WO2004084136 | 9/2004 |

OTHER PUBLICATIONS

Cohen, et al., "Detecting and Tracking Moving Objects for Video Surveillance", Computer Vision and Pattern Recognition, IEEE conference, vol. 2, Jun. 23, 1999, pp. 319-325.

Yalcin, et al., "A Flow-Based Approach to Vehicle Detection and Background Mosaicking in Airborne Video", Technical Reports, Mar. 2005, pp. 1-15.

Efe, et al., "A Tracking Algorithm For Both Highly Maneuvering and Nonmaneuvering Targets", Proceedings of the 36th Conference on Decision & Control, San Diego, CA, Dec. 10, 1997, vol. 4, pp. 3150-3155.

* cited by examiner

METHODS AND SYSTEMS FOR DATA LINK FRONT END FILTERS FOR SPORADIC UPDATES

CROSS REFERENCE TO RELATED APPLICATIONS

This patent application is related to the following co-pending, commonly-owned U.S. patent applications: U.S. patent application Ser. No. 11/383,914 entitled "Methods and Systems for The Detection of the Insertion, Removal, and Change of Objects Within a Scene Through the Use of Imagery" filed on May 17, 2006; U.S. patent application Ser. No. 11/383,911 entitled "Multiple Moving Target Detection" filed on May 17, 2006; U.S. patent application Ser. No. 11/383,907 entitled "Route Search Planner" filed on May 17, 2006; and U.S. patent application Ser. No. 11/383,900 entitled "Sensor Scan Planner" filed on May 17, 2006 (now U.S. Pat. No. 7,676,064), which applications are incorporated herein by reference.

This patent application is related to the following commonly-owned U.S. patent applications: U.S. patent application Ser. No. 11/383,914 entitled "Methods and Systems for The Detection of the Insertion, Removal, and Change of Objects Within a Scene Through the Use of Imagery" filed on May 17, 2006 under U.S. patent application Ser. No. 11/383,911 entitled "Multiple Moving Target Detection" filed on May 17, 2006 under U.S. patent application Ser. No. 11/383,907 entitled "Route Search Planner" filed on May 17, 2006 under and U.S. patent application Ser. No. 11/383,900 entitled "Sensor Scan Planner" filed on May 17, 2006 under which applications are incorporated herein by reference.

FIELD OF THE INVENTION

This invention relates to systems and methods for tracking moving objects, and more specifically, to front end filters for data links that may be used, for example, for controlling on board sensors on an unmanned air vehicle or other suitable platform.

BACKGROUND OF THE INVENTION

In some applications, sensors or cameras positioned on unmanned aerial vehicles (UAVs) or other airborne platforms may be used to track objects moving on the ground. Such systems may be used in civil applications, such as tracking vehicles by law enforcement and other governmental authorities, or in military applications, such as tracking mobile missiles or armored vehicles by military and intelligence organizations. Examples of prior art UAV-based systems include those systems disclosed, for example, in U.S. Pat. No. 6,712,312 B1 issued to Kucik, U.S. Pat. No. 5,575,438 issued to McGonigle et al., and U.S. Pat. No. 3,778,007 issued to Kearney et al.

In general, as an object moves along the ground, a tracking sensor on the UAV or other airborne platform (e.g. missile) may be steered to prevent the moving object from disappearing from the sensor's field of view. Updates on the position (and velocity) of the moving object may be transmitted to the UAV by a third party observer (or support system) to enable an on-board system to issue pointing commands to steer the tracking sensor to continue tracking the moving object. These updates are generally referred to as "data link updates." Examples of third party observers include an Intelligent Surveillance and Reconnaissance (ISR) platform and a ground observer with a portable target designation system.

The data link updates of existing third party observer systems usually have large measurement uncertainties. Unless special arrangements are made to improve the accuracy of these data link updates, direct use of existing data link data without any filtering may cause the on-board sensor to abruptly transition from one look angle to another when a data link update occurs. Since a sensor tracker is designed to track a moving object within a relatively stable scene, the sensor may lose track of a moving object when the scene changes abruptly.

Some on-board systems feed the data link updates to a Kalman filter to estimate and predict the path the moving objects are taking, and thus provide a smoother pointing command. A Kalman filter is typically characterized by statistical models of data link updates and process noise. The Kalman filtering process involves an iterative algorithm that requires several data link updates for its output to converge if the selected uncertainty models match the true statistics. If the statistical information about the data link update error and process noise model does not match the true statistics, the Kalman filter will either oscillate or diverge, resulting in the on-board system being unable to properly steer the sensor to track the moving object. Existing methods of filtering (e.g. adaptive Kalman filtering, or mode switching Kalman filtering) undesirably require a relatively large number of data link updates for the iterative process to converge and thus provide smooth sensor pointing commands to adequately prevent oscillation or divergence of the on-board tracking system. Therefore, novel systems and methods which provide stable sensor pointing commands using fewer, more sporadic data link updates, and using data link updates having relatively large statistical variability, such as those generated by a ground operator with a portable target designation system and existing legacy surveillance systems, would have utility.

SUMMARY OF THE INVENTION

The present invention provides systems and methods having front end filters for data links to provide improved sensor pointing commands to enable the robust tracking of moving objects. Embodiments of the present invention may advantageously condition the data link data to reduce or eliminate erratic movement of a tracking sensor when data link updates from support systems have relatively sporadic update rates and relatively large variability in the statistics of measurement update uncertainties, in comparison with the prior art.

In one embodiment, a method of tracking a moveable object includes sensing at least one characteristic of the moveable object using a sensor of an acquisition system, and sensing at least one characteristic of the moveable object using an auxiliary sensor. A data link update is transmitted from the auxiliary (or third party observer) sensor to the acquisition system, and the data link update is processed to provide a composite likelihood of where the moving object may be, wherein the processing includes: differencing the data link update and at least one predicted characteristic of the moveable object to produce at least one residual, and determining the composite likelihood based on the at least one residual. The method further includes adjusting a viewing direction of the sensor based at least in part on the composite likelihood resulting from the conditioning of the data link update.

In further embodiments, the conditioning of the data link update further includes: receiving the data link update into a plurality of Kalman filters coupled in parallel, each Kalman filter being tuned to a specific combination of measurement error statistics and position error statistics, and configured to output the at least one predicted characteristic; predicting at least one characteristic using the plurality of Kalman filters; determining residuals using the at least one predicted characteristic and the data link update; projecting a plurality of covariance matrices along a sensor line of sight; weighting the plurality of covariance matrices; and wherein determining the composite likelihood includes combining the weighted covariance matrices.

BRIEF DESCRIPTION OF THE DRAWINGS

Embodiments of the present invention are described in detail below with reference to the following drawings.

DETAILED DESCRIPTION

The present invention relates to systems and methods having front end filters for data links to provide improved sensor pointing commands to enable the robust tracking of moving objects. Many specific details of certain embodiments of the invention are set forth in the following description and in FIGS. 1 through 7 to provide a thorough understanding of such embodiments. One skilled in the art, however, will understand that the present invention may have additional embodiments, or that the present invention may be practiced without several of the details described in the following description.

Embodiments of systems and methods in accordance with the present invention may provide front end filters for data links that may be used, for example, for controlling on board sensors on an unmanned air vehicle or other suitable platform using data link information from other sources (e.g. in a Network Centric Operation environment) in which the sources have sporadic update rates and large variability in the statistics of measurement update uncertainties. More specifically, embodiments of the invention may address the issues associated with using existing data link infrastructures and other low cost data link sources that have, in at least some embodiments, large variability in their measurement uncertainties and possibly with only sporadic update rates, for example a ground operator with a portable target designation system or existing legacy surveillance data link systems. The existing methods that are currently in use are unable to provide satisfactory results under these conditions. Thus, embodiments of the present invention may provide tracking of moving objects with relatively fewer updates, and with improved tolerance for statistical uncertainty, in comparison with prior art methods and systems.

While features and concepts of the described systems and methods can be implemented in any number of different environments, systems, and/or configurations, embodiments of systems and methods in accordance with the present invention are described in the context of the following exemplary environment and system architectures.

Figure 1:
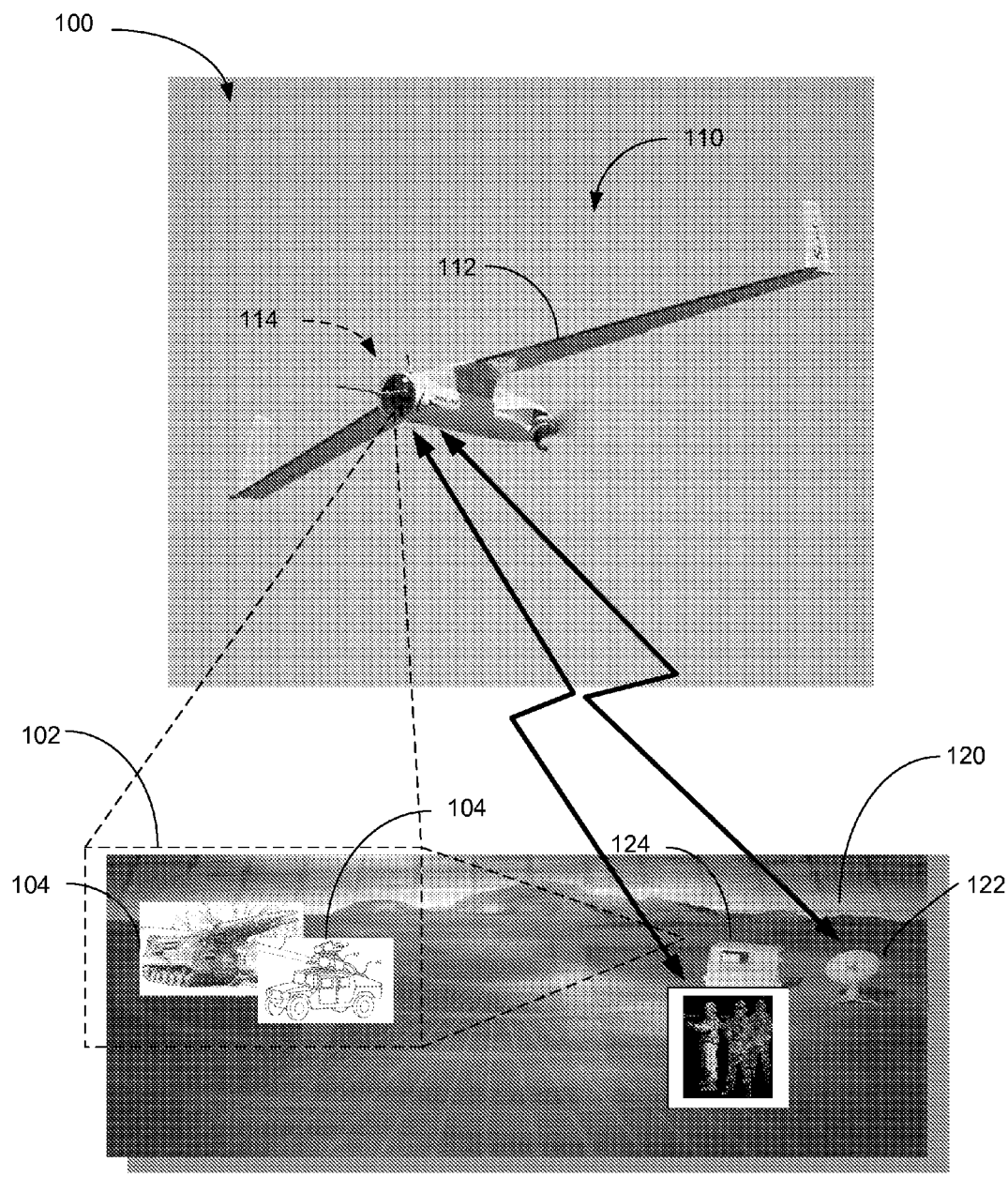
FIG. 1 is a tracking system in accordance with an embodiment of the invention.
Figure 2:
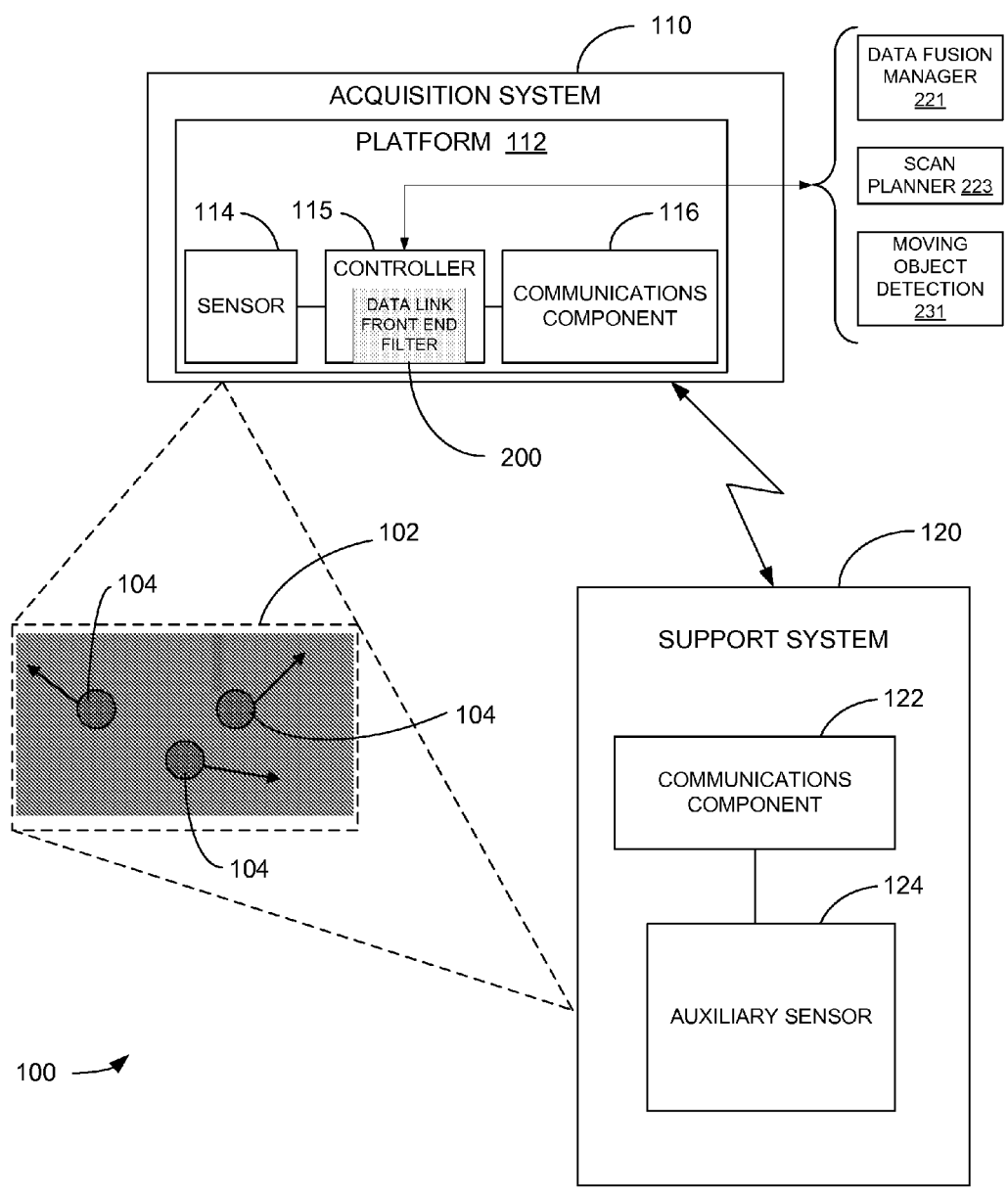
FIG. 2 is a schematic representation of the tracking system of FIG. 1.

FIG. 1 is a tracking system 100 in accordance with an embodiment of the present invention. FIG. 2 is a schematic representation of the tracking system 100 of FIG. 1. In this embodiment, the system 100 includes an acquisition system 110 and a support system 120. The acquisition system 110 includes a platform 112 having a sensor 114 coupled to a controller 115, and a communications component 116 also coupled to the controller 115. Similarly, the support (or third party observer) system 120 includes a communications component 122 coupled to an auxiliary sensor 124. The tracking system 100 may be of a type known as a Network Centric Operation (NCO).

Figure 7:
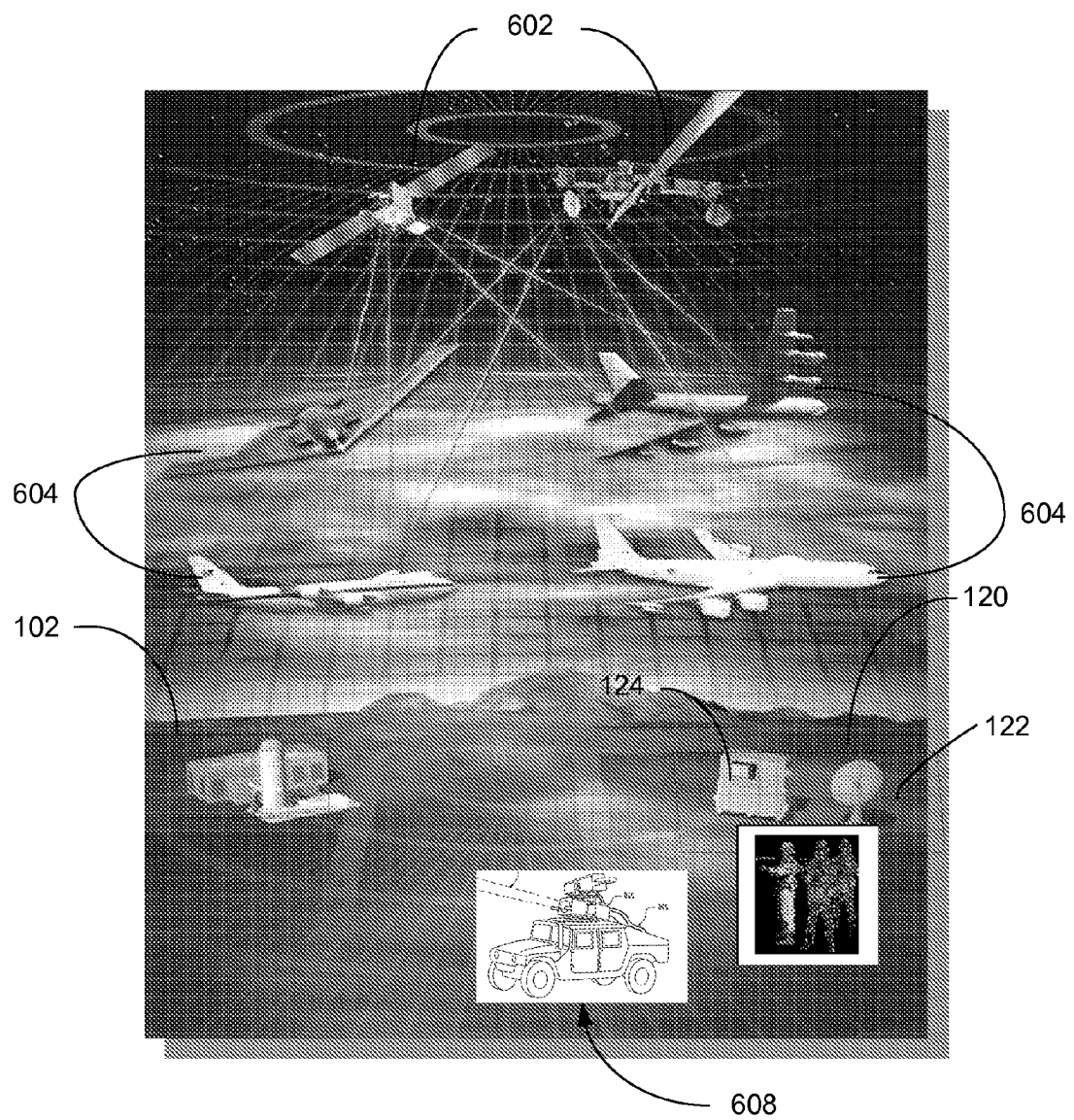
FIG. 7 shows a variety of sensor platforms that may be used in systems in accordance with alternate embodiments of the invention

In the embodiment shown in FIG. 1, the platform 112 is an aircraft, and more specifically, an unmanned aerial vehicle (UAV), and the support system 120 is a ground-based support system, which may include a ground operator with a portable target designation system. In alternate embodiments, the platform 112 (and the support system 120) may be any suitable stationary or moveable platform. For example, FIG. 7 shows a variety of sensor platforms 112 that may be used in place of the particular UAV embodiment (and in place of the ground-based support system 120) shown in FIG. 1, including satellites or other space-based platforms 602, manned aircraft 604, land-based vehicles 608, or any other suitable platforms. In further embodiments, the platform 112 may be a sea-based platform. Similarly, the sensor 114 (and the auxiliary sensor 124) may be any suitable type of sensors, including, for example, visible wavelength sensors (e.g. photographic systems), infrared sensors, radar systems, laser radar systems, or any other suitable sensors or systems. In a particular embodiment, the sensor 114 (and the auxiliary sensor 124) may be a high resolution sensor typically used for on-board terminal guidance of weapons systems (e.g. missiles) and having a relatively narrow field of view.

In operation, the acquisition system 110 is positioned such that the sensor 114 may observe one or more moving objects 104 within a field of view 102. Information regarding the moving objects 104 (e.g. position, velocity, etc.) is provided by the sensor 114 to the controller 115. The controller 115 may adjust (or steer) the sensor 114 to maintain one or more of the moving objects 104 within the field of view 102. The controller 115 may also transmit the information regarding the moving objects 104 to the ground support system 120 via the communications component 116.

Similarly, the auxiliary sensor 124 of the ground support system 120 may observe and track the one or more moving objects 104, and may provide one or more data link updates on the status of the moving objects 104 (e.g. position, velocity, etc.) to the acquisition system 110 via the communications component 122. The controller 115 may receive the data link updates via the communications component 116, and may issue appropriate pointing commands to steer the sensor 114 to continue tracking the moving objects 104.

As described above, the data link updates may have measurement uncertainties which hamper the ability of the controller 115 to smoothly steer the sensor 114 in such a manner as to maintain the target within the sensor field of view, negatively affecting the ability of acquisition system 110 to track the moving objects 104 consistently. Therefore, in accordance with embodiments of the present invention, the acquisition system 110 includes a data link front end filter 200 configured to filter (or condition) the information contained in the data link updates to improve the ability of the acquisition system 110 to track the moving objects 104. As shown in FIG. 2, in some embodiments, the data link front end filter 200 is configured within the controller 115. In alternate embodiments, however, the data link front end filter 200 may be separate from the controller 115, and may be disposed in any suitable portion or location within the acquisition system 110. In the embodiment shown in FIG. 2, the controller 115 further includes a data fusion manager 221, a scan planner 223, and a moving object detection module 231, the interaction and operation of which will be described more fully below.

Figure 3:
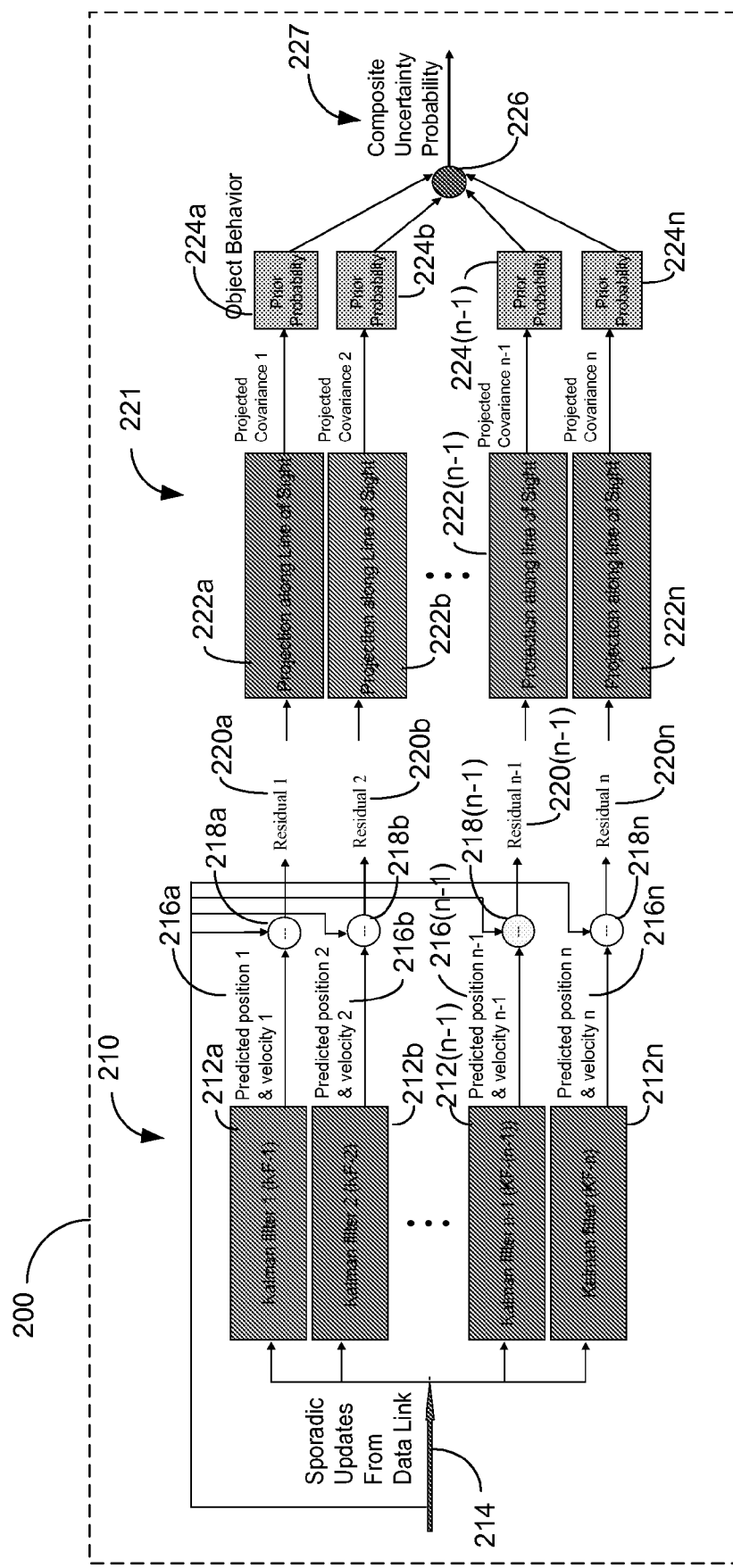
FIG. 3 is a data link front end filter in accordance with an embodiment of the invention.
Figure 4:
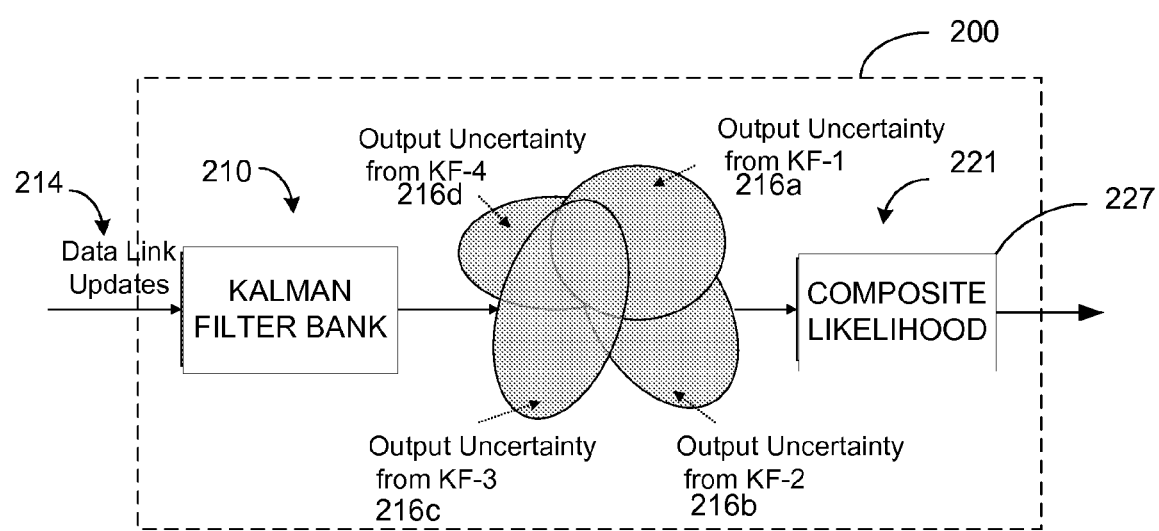
FIG. 4 is a schematic representation of a portion of a method of conditioning data link updates in accordance with an embodiment of the invention.

Aspects of the data link front end filter 200 will now be described with reference to FIGS. 3 through 7. Specifically, FIG. 3 is an enlarged schematic view of the data link front end filter 200 of FIG. 2. FIG. 4 is a schematic representation of the operation of the data link front end filter 200 of FIG. 3 in conjunction with other components of the controller 115. In this embodiment, the data link front end filter 200 includes a filter bank 210 configured in accordance with an embodiment of the invention. In this embodiment, the filter bank 210 includes a plurality of Kalman filters 212 coupled in parallel, each tuned to a specific combination of measurement error statistics and position error statistics. A data link update 214 is received by the data link front end filter 210 and is transmitted to the plurality of Kalman filters 212. Each of the Kalman filters 212 outputs a set of predicted object information 216 (e.g. predicted position and velocity) to a differencing component 218, which in turn outputs a residual (or difference) 220 between each set of predicted object information 216 and the current data link update 214.

As further shown in FIG. 3, a covariance matrix 222, which is a statistical average of the noise power of the residual 220 for each Kalman filter 212. Each covariance matrix 222 is projected onto the ground along an estimated line of sight of the sensor 114. The projected co-variances 222 are weighted by weighting factors 224 that are proportional to a probability of occurrence of a particular combination of measurement error statistics and object position error statistics, and are combined by a combining component 226 into a composite residual (or composite likelihood) 227. The resulting composite residual 227, which is a weighted sum of all the projected co-variances 222, may be multi-model and non-Gaussian.

The composite residual 227 is output by the data link front end filter 200, and may be used by the controller 115 in several ways. The composite residual 227 may also be used by the methods disclosed in U.S. patent application Ser. No. 11/383,900 Entitled "Sensor Scan Planner" filed on May 17, 2006 to extract possible estimated object locations on the ground from the data link updates 214 provided by a support (or a third party observer) system. In turn, the possible object locations from the "Sensor Scan Planner" may be merged with object locations (e.g. as estimated using methods disclosed in U.S. patent application Ser. No. 11/383,911 entitled "Multiple Moving Target Detection" filed on May 17, 2006 ) for improved steering of the sensor 114 to maintain the moving object 104 within the field of view 102. Therefore, due to the operation of the data link front end filter 200, the sensor 114 may have a relatively higher probability of maintaining a moving object 104 within its view, even a sensor 114 having a relatively narrow field of view, and even with a data link that has unknown statistical model and only sporadic updates.

Generally, any of the functions described herein can be implemented using software, firmware (e.g., fixed logic circuitry), hardware, manual processing, or a combination of these implementations. The terms "module," "component", "functionality," and "logic" as used herein generally represent software, firmware, hardware, or any combination thereof. In the case of a software implementation, the module, component, functionality, or logic represents program code that performs specified tasks when executed on processor(s) (e.g., any of microprocessors, controllers, and the like). The program code can be stored in one or more computer readable memory devices, examples of which are described with reference to the exemplary computing-based device 500 shown in FIG. 6. Further, the methods and systems described herein are platform-independent such that the techniques may be implemented on a variety of commercial computing platforms having a variety of processors.

Methods in accordance with the present invention may also be described in the general context of computer executable instructions. Generally, computer executable instructions can include routines, programs, objects, components, data structures, procedures, modules, functions, and the like that perform particular functions or implement particular abstract data types. The methods described herein may also be practiced in a distributed computing environment where functions are performed by remote processing devices that are linked through a communications network. In a distributed computing environment, computer executable instructions may be located in both local and remote computer storage media, including memory storage devices.

Figure 5:
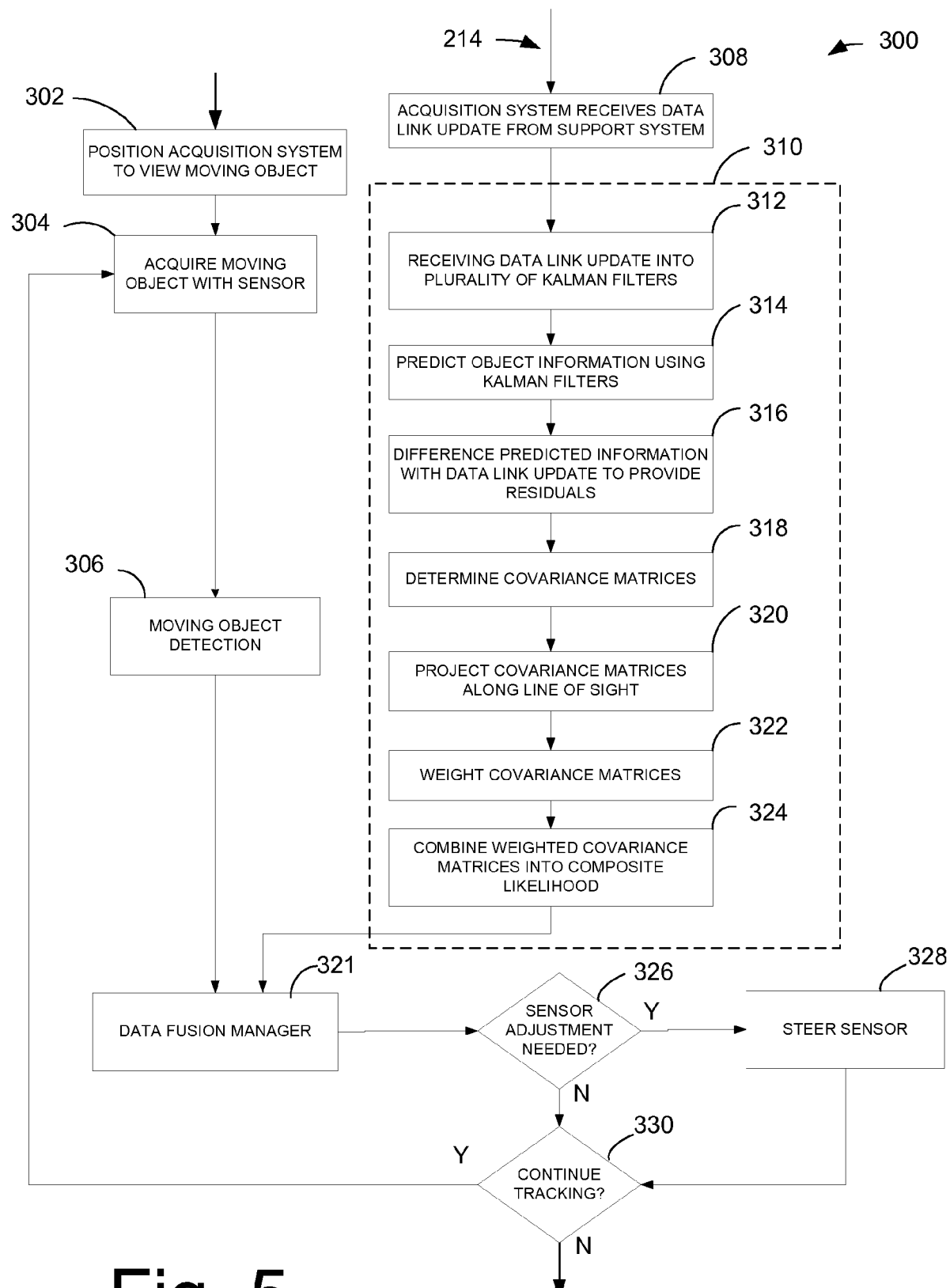
FIG. 5 is a flow chart of a method of tracking a moving object in accordance with an embodiment of the invention.

FIG. 5 is a flow chart of a method 300 of tracking a moving object in accordance with an embodiment of the invention. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein.

In this embodiment, the method 300 includes positioning an acquisition system having a sensor in a suitable position with respect to one or more moving objects at a block 302. The positioning may include, for example, controllably directing a sensor platform (e.g. a UAV) that carries the sensor into proximity of (or a line of sight with) the moving object. Alternately, as described above, the acquisition system may include any suitable ground-based, airborne, seaborne, or space-based platform or system. At a block 304, the sensor is steered to contain the one or more moving objects within its field of view, and at a moving object detection block 306, the sensor determines information of interest (e.g. position, velocity, etc.) regarding the one or more moving objects. In some embodiments, the block 306 is performed in accordance with the methods and systems for moving object detection, as described in previously-incorporated U.S. patent application Ser. No. 11/383,911 entitled "Multiple Moving Target Detection" filed on May 17, 2006.

The method 300 further includes conditioning (or filtering) the information contained in the one or more data link updates to improve the ability of the acquisition system to track the moving objects, depicted generally as a block 310. More specifically, in this embodiment, the conditioning (block 310) includes receiving one or more data link updates from a support (or third party observer) system into a plurality of Kalman filters at a block 312. As described above, the support (or third party observer) may include any suitable ground-based, airborne, seaborne, or space-based platform or system, or ground observer with a portable target designating system. Each Kalman filter may be tuned to a specific combination of measurement error statistics and position error statistics. At a block 314, the Kalman filters output a set of predicted object information (e.g. predicted position and velocity), and a corresponding set of residuals (or differences) between each set of predicted object information and the current data link update is determined at a block 316. Covariance matrices are determined from the residuals at a block 318. The covariance matrices are projected onto the ground along an estimated line of sight of the sensor at a block 320. The covariance matrices are weighted by weighting factors that are proportional to a probability of occurrence of a particular combination of measurement error statistics and object position error statistics at a block 322, and the weighted covariance matrices are combined into a composite residual (or composite likelihood) at a block 324.

As further shown in FIG. 5, the composite likelihood 227 determined by the conditioning of the data link update information (310) is received into a data fusion manager at a block 321, which merges the composite likelihood 227 with other object location information. A number of suitable data fusion manager methods and systems are known that may be used for this purpose. In one particular embodiment, the data fusion manager (block 321) merges the results of the conditioning of the data link update information (block 310) with object locations estimated using methods disclosed in previously-incorporated U.S. patent application Ser. No. 11/383,911 entitled "Multiple Moving Target Detection" filed on May 17, 2006.

At a block 326, the method 300 determines whether to adjust (or steer) the sensor to improve tracking or to maintain the moving objects within the sensor's field of view at a block 326. If sensor adjustment is needed, then the sensor adjustment is performed at a block 328 using the output from data fusion manager 321. Again, in some embodiments, the sensor adjustment is performed in accordance with the methods and systems for scheduling optimal sensor scanning, as described in previously-incorporated U.S. patent application Ser. No. 11/383/900 entitled "Sensor Scan Planner" filed on May 17, 2006.

More specifically, in some embodiments, the inputs to the data fusion manager (block 321) are the likelihood of object locations of the filtered (conditioned) data link updates and the likelihood of estimated object locations from a moving object detection (block 331). The output of the data fusion manager (block 321) may be fed to a scan planner where the output of the scan planner may be used to steer the sensor (block 328).

As further shown in FIG. 5, at a block 330, the method 300 determines whether to continue tracking the one or more moving objects. If continued tracking is needed, the method 300 returns to block 304 for continuing sensor acquisition. In one embodiment, the method 300 then goes to 306, in other embodiment the method may go to block 321 directly, by passing block 306. The method then repeats the actions described above. If continued tracking is not needed (block 330), the method 300 is complete.

Figure 6:
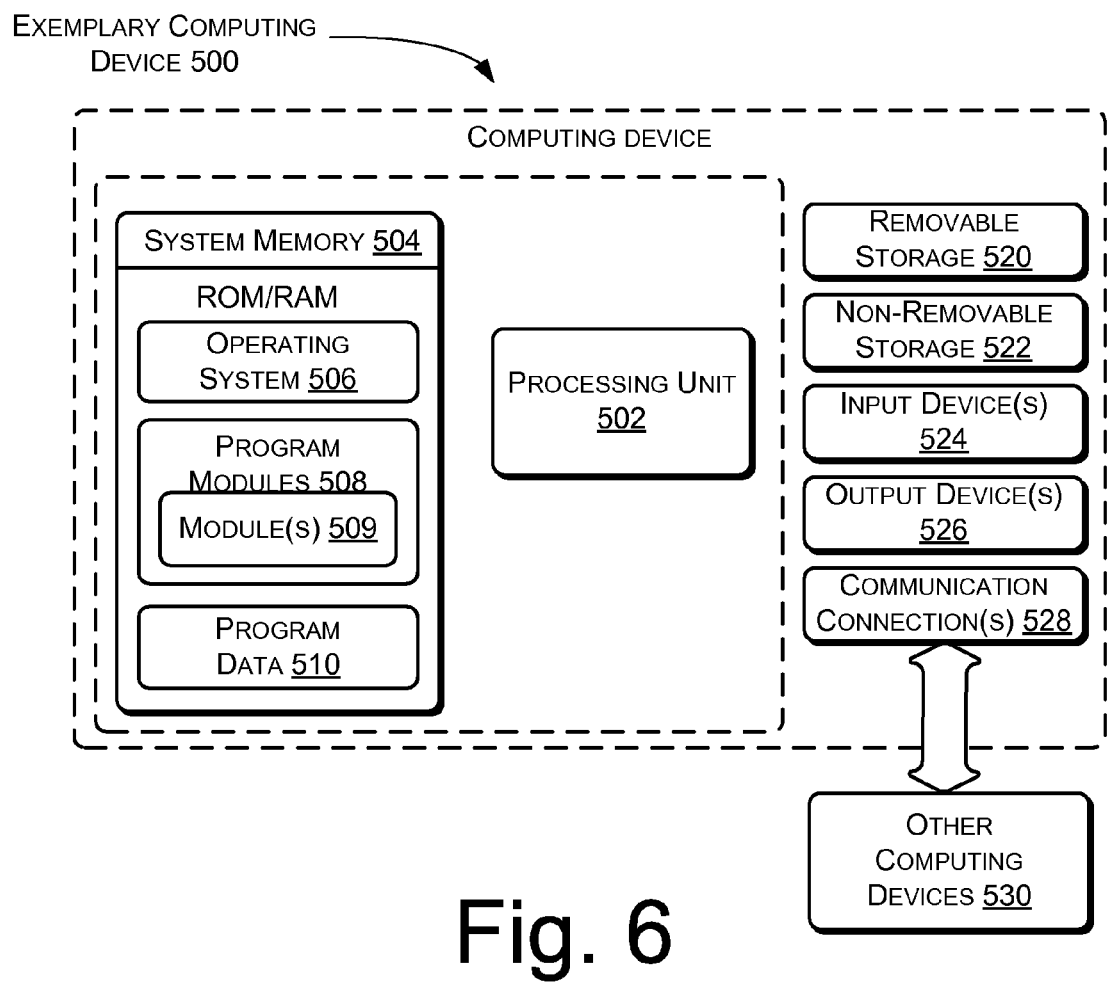
FIG. 6 illustrates a computing device configured in accordance with an embodiment of the invention.

FIG. 6 illustrates a computing device 500 configured in accordance with an embodiment of the invention. The computing device 500 may be used, for example, as the controller 115, or other suitable component, of the tracking system 100 of FIG. 1. In a very basic configuration, the computing device 500 includes at least one processing unit 502 and system memory 504. Depending on the exact configuration and type of computing device 500, the system memory 504 may be volatile (such as RAM), non-volatile (such as ROM and flash memory) or some combination of the two. The system memory 504 typically includes an operating system 506, one or more program modules 508, and may include program data 510.

For the present methods of tracking moving objects, the program modules 508 may include the process modules 509 that realize one or more the processes described herein. Other modules described herein may also be part of the program modules 508. As an alternative, process modules 509, as well as the other modules, may be implemented as part of the operating system 506, or it may be installed on the computing device and stored in other memory (e.g., non-removable storage 522) separate from the system memory 506.

The computing device 500 may have additional features or functionality. For example, the computing device 500 may also include additional data storage devices (removable and/or non-removable) such as, for example, magnetic disks, optical disks, or tape. Such additional storage is illustrated in FIG. 6 by removable storage 520 and non-removable storage 522. Computer storage media may include volatile and non-volatile, removable and non-removable media implemented in any method or technology for storage of information, such as computer readable instructions, data structures, program modules, or other data. The system memory 506, removable storage 520 and non-removable storage 522 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of the device 500. Computing device 500 may also have input device(s) 524 such as keyboard, mouse, pen, voice input device, and touch input devices. Output device(s) 526 such as a display, speakers, and printer, may also be included. These devices are well know in the art and need not be discussed at length.

The computing device 500 may also contain a communication connection 528 that allow the device to communicate with other computing devices 530, such as over a network. Communication connection(s) 528 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, and so forth for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of tracking a moveable object, comprising:
sensing at least one characteristic of the moveable object using a sensor of an acquisition system;

sensing at least one characteristic of the moveable object using an auxiliary sensor;
transmitting a data link update from the auxiliary sensor to the acquisition system;
conditioning the data link update to provide a composite likelihood, wherein the conditioning includes:
differencing the data link update and at least one predicted characteristic of the moveable object to produce at least one residual; and
determining the composite likelihood based on the at least one residual; and
adjusting a viewing direction of the sensor based at least in part on the composite likelihood resulting from the conditioning of the data link update.

2. The method of claim 1, wherein conditioning the data link update includes receiving the data link update into a plurality of Kalman filters, each Kalman filter being tuned to a specific combination of measurement error statistics and position error statistics, and configured to output the at least one predicted characteristic.

3. The method of claim 1, wherein the conditioning includes:
receiving the data link update into a plurality of Kalman filters;
predicting at least one characteristic using the plurality of Kalman filters;
determining residuals using the at least one predicted characteristic and the data link update; and
determining the composite likelihood based at least in part on the residuals.

4. The method of claim 3, wherein the conditioning further includes:
projecting a plurality of covariance matrices along a sensor line of sight; and
weighting the plurality of covariance matrices;
and wherein determining the composite likelihood includes combining the weighted covariance matrices.

5. The method of claim 3, wherein conditioning the data link update includes receiving the data link update into a plurality of Kalman filters, each Kalman filter being tuned to a specific combination of measurement error statistics and position error statistics, and configured to output the at least one predicted characteristic.

6. The method of claim 1, wherein the conditioning includes:
receiving the data link update into a plurality of Kalman filters coupled in parallel, each Kalman filter being tuned to a specific combination of measurement error statistics and position error statistics, and configured to output the at least one predicted characteristic;
predicting at least one characteristic using the plurality of Kalman filters;
determining residuals using the at least one predicted characteristic and the data link update;
projecting a plurality of covariance matrices along a sensor line of sight;
weighting the plurality of covariance matrices; and
wherein determining the composite likelihood includes combining the weighted covariance matrices.

7. The method of claim 1, further comprising translating the sensor into a position configured to view the moveable object using a moveable platform, the moveable platform including at least one of an unmanned aircraft, a manned aircraft, a land-based platform, a sea-based platform, and a space-based platform.

8. The method of claim 1, wherein sensing at least one characteristic of the moveable object using an auxiliary sensor includes sensing at least one characteristic of the moveable object using at least one of an unmanned aircraft, a manned aircraft, a ground-based vehicle, a space-based vehicle, and an operator on the ground with a targeting designating device.

9. The method of claim 1, wherein adjusting a viewing direction of the sensor based at least in part on the composite likelihood includes merging the composite likelihood with other moving object information using a data fusion manager, and generating a sensor control signal based at least in part on the composite likelihood to adjust the viewing direction of the sensor.

10. One or more computer-readable media comprising computer executable instructions that, when executed, direct a tracking system to:
sense at least one characteristic of a moveable object using a sensor of an acquisition system;
sense at least one characteristic of the moveable object using an auxiliary sensor;
transmit a data link update from the auxiliary sensor to the acquisition system;
condition the data link update to provide a composite uncertainty probability, including:
difference the data link update and at least one predicted characteristic of the moveable object to produce at least one residual; and
determine the composite likelihood based on the at least one residual; and
adjust the position of the sensor based at least in part on the composite likelihood resulting from the conditioning of the data link update.

11. The one or more computer-readable media of claim 10, wherein condition the data link update includes receive the data link update into a plurality of Kalman filters, each Kalman filter being tuned to a specific combination of measurement error statistics and position error statistics, and configured to output the at least one predicted characteristic.

12. The one or more computer-readable media of claim 10, wherein condition the data includes:
receive the data link update into a plurality of Kalman filters;
predict at least one characteristic using the plurality of Kalman filters;
determine residuals using the at least one predicted characteristic and the data link update; and
determine the composite likelihood based at least in part on the residuals.

13. The one or more computer-readable media of claim 12, wherein condition the data further includes:
project a plurality of covariance matrices along a sensor line of sight; and
weight the plurality of covariance matrices;
and wherein determine the composite likelihood includes combine the weighted covariance matrices.

14. The one or more computer-readable media of claim 10, wherein condition the data further includes:
receive the data link update into a plurality of Kalman filters coupled in parallel, each Kalman filter being tuned to a specific combination of measurement error statistics and position error statistics, and configured to output the at least one predicted characteristic;
predict at least one characteristic using the plurality of Kalman filters;
determine residuals using the at least one predicted characteristic and the data link update;
project a plurality of covariance matrices along a sensor line of sight; and weight the plurality of covariance matrices;
and wherein determine the composite likelihood includes combine the weighted covariance matrices.

15. A system for tracking a moveable object, comprising:
a sensor configured to sense at least one characteristic of the moveable object;
a communication component configured to receive a data link update; and
a control component operatively coupled to the communication component and to the sensor, the control component including a data conditioner configured to condition the data link update to provide a composite likelihood, including:
difference the data link update and at least one predicted characteristic of the moveable object to produce at least one residual; and
determine the composite likelihood based on the at least one residual;
and wherein the control component is further configured to transmit a control signal to adjust a viewing direction of the sensor based at least in part on the composite likelihood.

16. The system of claim 15, wherein the control component includes a plurality of Kalman filters, each Kalman filter being tuned to a specific combination of measurement error statistics and position error statistics, and being configured to receive at least a portion of the data link update, and to output the at least one predicted characteristic.

17. The system of claim 15, wherein the data conditioner is further configured to condition the data link update, including:
receive the data link update into a plurality of Kalman filters;
predict at least one characteristic using the plurality of Kalman filters;
determine residuals using the at least one predicted characteristic and the data link update; and
determine the composite likelihood based at least in part on the residuals.

18. The system of claim 17, wherein the data conditioner is further configured to condition the data link update, including:
project a plurality of covariance matrices along a sensor line of sight; and
weight the plurality of covariance matrices;
and wherein determine the composite likelihood includes combine the weighted covariance matrices.

19. The system of claim 15, wherein the data conditioner is further configured to condition the data link update, including:
receive the data link update into a plurality of Kalman filters coupled in parallel, each Kalman filter being tuned to a specific combination of measurement error statistics and position error statistics, and configured to output the at least one predicted characteristic;
predict at least one characteristic using the plurality of Kalman filters;
determine residuals using the at least one predicted characteristic and the data link update;
project a plurality of covariance matrices along a sensor line of sight; and
weight the plurality of covariance matrices;
and wherein determine the composite likelihood includes combine the weighted covariance matrices.

20. The system of claim 15, further comprising a moveable platform configured to support the sensor, the communication component, and the control component, the moveable platform being configured to translate the sensor in a location configured to view the moveable object, the moveable platform including at least one of an unmanned aircraft, a manned aircraft, a land-based platform, a sea-based platform, and a space-based platform.

* * * * *